(12) United States Patent
Sønderkær et al.

(10) Patent No.: US 10,697,231 B2
(45) Date of Patent: *Jun. 30, 2020

(54) SMALL DIAMETER EVACUATION HEAD FOR VIG UNIT MANUFACTURE

(71) Applicant: VKR HOLDING A/S, Hørsholm (DK)

(72) Inventors: Peter Sønderkær, Horsens (DK); Thomas Villiam Sejer Mikkelsen, Hørning (DK)

(73) Assignee: VKR HOLDING A/S, Hørsholm (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/753,668

(22) PCT Filed: Aug. 22, 2016

(86) PCT No.: PCT/DK2016/050281
§ 371 (c)(1),
(2) Date: Feb. 20, 2018

(87) PCT Pub. No.: WO2017/028869
PCT Pub. Date: Feb. 23, 2017

(65) Prior Publication Data
US 2019/0003243 A1 Jan. 3, 2019

(30) Foreign Application Priority Data

Aug. 20, 2015 (DK) .................................. 201500487

(51) Int. Cl.
*E06B 3/677* (2006.01)
*C03C 27/06* (2006.01)
(Continued)

(52) U.S. Cl.
CPC ............ *E06B 3/6775* (2013.01); *C03C 27/06* (2013.01); *E06B 3/6612* (2013.01);
(Continued)

(58) Field of Classification Search
CPC .... E06B 3/6612; E06B 3/6736; E06B 3/6775; Y02B 80/24; C03C 27/06
See application file for complete search history.

(56) References Cited

U.S. PATENT DOCUMENTS 6,468,610 B1 * 10/2002 Morimoto ............. E06B 3/6612
428/34
2006/0175767 A1 8/2006 Collins et al.
(Continued)

FOREIGN PATENT DOCUMENTS

EP 1013869 A1 6/2000
EP 1769129 4/2007
(Continued)

OTHER PUBLICATIONS

Extended European Search Report for Application No. 16836690.4; dated Jun. 1, 2018, five pages.
(Continued)

*Primary Examiner* — Donald J Loney
(74) *Attorney, Agent, or Firm* — Cantor Colburn LLP

(57) ABSTRACT

A method of producing a vacuum insulated glass (VIG) unit comprising providing first and second substantially parallel glass panes, a plurality of pillars, and a peripheral seal between the first and second glass panes; providing an evacuation hole for evacuating a void through the evacuation hole to a pressure less than atmospheric pressure, wherein the first and second glass panes are tempered glass; covering the evacuation hole with an evacuation head, wherein the evacuation head is configured to have a substantially hermetic contact to a surface of the first glass pane, wherein a contact width of the evacuation head to the surface of the first glass pane is less than 50 mm; and evacuating the void through the evacuation head.

14 Claims, 7 Drawing Sheets

(51) Int. Cl.
*E06B 3/66* (2006.01)
*E06B 3/673* (2006.01)
*E06B 3/663* (2006.01)

(52) U.S. Cl.
CPC ........ *E06B 3/6736* (2013.01); *E06B 3/66304* (2013.01); *Y02A 30/25* (2018.01); *Y02B 80/24* (2013.01)

(56) References Cited

U.S. PATENT DOCUMENTS

| | | |
|---|---|---|
| 2008/0069983 A1 | 3/2008 | Minaai |
| 2009/0155500 A1 | 6/2009 | Cooper et al. |
| 2012/0148795 A1 | 6/2012 | Kwon et al. |

FOREIGN PATENT DOCUMENTS

| | | |
|---|---|---|
| JP | 2002128544 A | 5/2002 |
| JP | 2002179439 A | 6/2002 |
| JP | 2002187745 A | 7/2002 |
| JP | 2004244292 A | 9/2004 |
| JP | 2004265775 A | 9/2004 |
| WO | 200029703 A1 | 1/1999 |
| WO | 200029704 A1 | 5/2000 |
| WO | 200063130 A1 | 10/2000 |
| WO | 200109471 A1 | 2/2001 |
| WO | 2003095388 A1 | 11/2003 |
| WO | 2004099097 A1 | 11/2004 |
| WO | 2014183515 A1 | 11/2014 |
| WO | 2017028869 A1 | 2/2017 |

OTHER PUBLICATIONS

Extended European Search Report for Application No. 16836691.2; dated Jun. 1, 2018, two pages.
European Patent Office Third Party Observations for Application No. 16836691.2-1005/3337943, dated Aug. 16, 2019, five pages.

\* cited by examiner

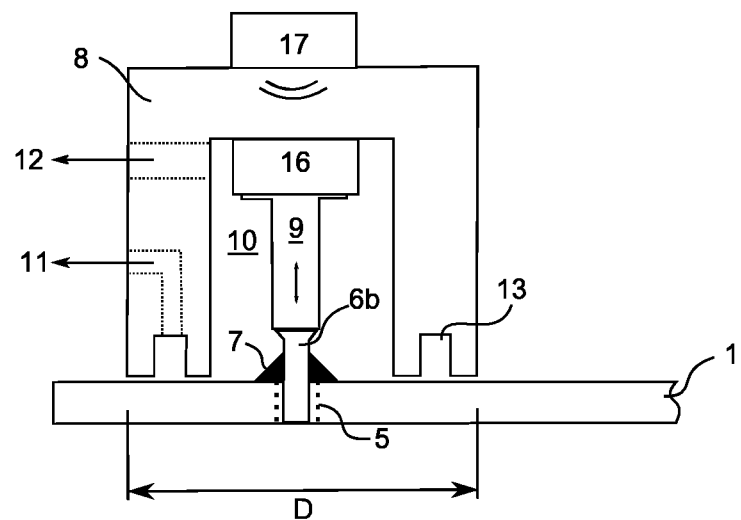
Fig. 7
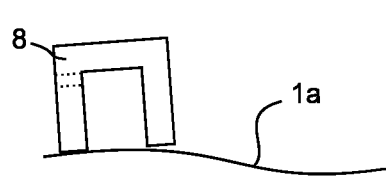    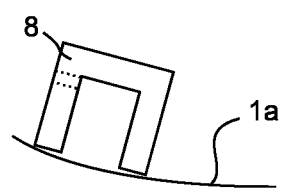
Fig. 8a            Fig. 8b

SMALL DIAMETER EVACUATION HEAD FOR VIG UNIT MANUFACTURE

CROSS REFERENCE TO RELATED APPLICATIONS

This application is a National Stage application of PCT/DK2016/050281, filed Aug. 22, 2016, which claims the benefit of DK Application No. PA201500487, filed Aug. 20, 2015, the entire contents of which are incorporated herein by reference.

BACKGROUND

This disclosure relates to a vacuum insulating glazing (VIG) unit. In particular, it relates to the vacuum evacuation head (also known as all metal cup). And sealing of the evacuation tube with a heater inside the evacuation head.

Vacuum insulating glazing (VIG) units typically comprise two glass panes spaced by pillars, sealed at the periphery and having an evacuated interior void. The void is evacuated with an evacuation head through a hole in the pane to a pressure such as 1E-6 bar.

US2006175767 discloses a VIG unit and an evacuation head being 70 mm. The disclosure deals with a gasket to ensure a good seal. Paragraph [0061] does mention an evacuation head diameter of 50 mm to 100 mm.

US20120148795 deals with the sealing of the evacuation hole. It discloses a prior art evacuation tube and evacuation head with a coil heater (FIG. 2a) which is used to melt the tube tip (also known as the tip off).

BRIEF SUMMARY

For decades there has been ongoing work with VIG gazing due to the promising insulation value which enables great energy savings to buildings. Production of VIG units however still has several drawbacks and lifetime challenges. It would be desirable to provide a better contact seal between the evacuation head and the glass pane. Further it would be desirable to provide an enhanced evacuation tube seal by better temperature application and better tube tip off. Further it would be desirable to provide a tempered glass VIG.

The disclosure relates to method, a VIG manufacture facility and a VIG unit. Favorable embodiments are defined in the dependent claims. Other objectives, features and advantages will appear from the following detailed disclosure. In particular, the disclosure relates to the below specific aspects and embodiments.

In a first aspect and embodiment there is disclosed a method of producing a vacuum insulated glazing (VIG) unit comprising: providing first and second substantially parallel panes 1,2, a plurality of pillars 4 and a peripheral seal 3 provided between the first and second panes 1,2, where in the first pane 1 there is provided an evacuation hole 5 for evacuating a void V through the evacuation hole 5 to a pressure less than atmospheric pressure; wherein the panes 1,2 are tempered glass; on a glass pane face 1*a*, covering the evacuation hole 5 with an evacuation head 8, the evacuation head 8 adapted to have a substantially hermetic contact to the glass pane face 1*a*; wherein the evacuation head 8 contact width D to the pane face 1*a* is less than 50 mm, preferably less than 45 mm; and evacuating the void V through the evacuation head 8.

In a second embodiment of the first embodiment of the first aspect there is disclosed a method of producing a VIG unit according to the previous embodiment, wherein the evacuation head 8 is adapted to reduce the temperature difference in the VIG body beneath the evacuation head 8 from the temperature in the surrounding VIG body.

In a third embodiment of the first embodiment of the first aspect there is disclosed a method of producing a VIG unit according to any previous embodiment, wherein the VIG unit is in an oven and the void V is evacuated in the oven.

In a fourth embodiment of the first embodiment of the first aspect there is disclosed a method of producing a VIG unit according to any previous embodiment, wherein the VIG body production in an oven includes heating the VIG unit in the oven and in all steps keeping the temperature below an annealing temperature, which detrimentally affects the tempered glass, such as keeping the temperature below 400° C.

In a fifth embodiment of the first embodiment of the first aspect there is disclosed a method of producing a VIG unit according to any previous embodiment, wherein the evacuating of the void V is done at 150° C. or more, preferably at 300° C. or more.

In a sixth embodiment of the first embodiment of the first aspect there is disclosed a method of producing a VIG unit according to any previous embodiment, wherein the temperature of the oven is between 150° C. and 400° C., preferably between 300° C. and 400° C.

In a seventh embodiment of the first embodiment of the first aspect there is disclosed a method of producing a VIG unit according to any previous embodiment, wherein the evacuating of the void V is done in the heated oven after substantially soldering the peripheral seal 3.

In an eighth embodiment of the first embodiment of the first aspect there is disclosed a method of producing a VIG unit according to any previous embodiment, wherein the peripheral seal 3 is substantially soldered in the heated oven and subsequently the evacuating of the void V is initiated.

In a ninth embodiment of the first embodiment of the first aspect there is disclosed a method of producing a VIG unit according to any previous embodiment, wherein an evacuation tube tip 6*b* is sealed off by heat provided by a heat element 9 in the evacuating head 8 chamber 10.

In a tenth embodiment of the first embodiment of the first aspect there is disclosed a method of producing a VIG unit according to any previous embodiment, wherein the evacuation head 8 is substantially circular and the contact width D is a diameter D.

In an eleventh embodiment of the first embodiment of the first aspect there is disclosed a method of producing a VIG unit according to any previous embodiment, wherein the pillars 4 are spaced a distance S and wherein the evacuation head 8 contact width D is equal or less than pillar 4 distance S.

In a twelfth embodiment of the first embodiment of the first aspect there is disclosed a method of producing a VIG unit according to any previous embodiment, wherein the evacuation head 8 has a ceramic heating element 9, and the method comprises: heating the ceramic heating element 9 and sealing off the tip 6*b* of an evacuation tube 6.

In a thirteenth embodiment of the first embodiment of the first aspect there is disclosed a method of producing a VIG unit according to any previous embodiment, comprising: heating the ceramic heating element 9 to a first temperature to provide a more uniform VIG body temperature T2 beneath the evacuation head 8, and heating the ceramic heating element to a second temperature to tip off the tube 6*b*.

In a fourteenth embodiment of the first embodiment of the first aspect there is disclosed a method of producing a VIG unit according to any previous embodiment, wherein the evacuation tube 6 is an evacuation cap 18 comprising an evacuation port 20 and a solder glass ring 19 arranged around the evacuation port 20.

In a first embodiment of a second aspect there is disclosed a vacuum insulated glazing (VIG) unit manufacture facility comprising an oven with a compartment adapted for heating a VIG unit, the oven comprising an evacuation head 8 in fluid communication with at least one vacuum pump, wherein the evacuation head 8 contact width D to the VIG is less than 50 mm, preferably less than 45 mm.

In a second embodiment of the second aspect there is disclosed a VIG unit manufacture facility according to the previous embodiment of the second aspect, the evacuation head 8 further comprising a ceramic heating element 9.

In a third embodiment of the second aspect there is disclosed a VIG unit manufacture facility according to any of the previous embodiments of the second aspect, wherein the ceramic heating element 9 is displaceable and configured to contact an evacuation tube tip 6*b* and preferably press the tube tip 6*b* to tip off the tube 6.

In a fourth embodiment of the second aspect there is disclosed a VIG unit manufacture facility according to any of the previous embodiments of the second aspect, configured to perform the method according to any of the first to fourteenth embodiments of the first aspect of the present disclosure.

In a first embodiment of a third aspect there is disclosed a vacuum insulated glazing (VIG) unit comprising tempered glass panes 1,2 comprising an evacuation cap 18 comprising an evacuation port 20 and a solder glass ring 19 arranged around the evacuation port 20, wherein the evacuation cap 18 is arranged on a pane face 1*a* of a first or second pane 1,2 and the evacuation cap 18 has a center distance substantially less than 25 mm from the pane 1,2 periphery, preferably less than 20 mm.

In a second embodiment of the third aspect there is disclosed a VIG unit according to the first embodiment of the third aspect, where the evacuation cap 18 is further situated at the corner of the pane face 1*a*, and the center distance hereby applies to both pane peripheries of said corner.

In a second embodiment of the third aspect there is disclosed a VIG unit according to either the first or second embodiment of the third aspect, comprising a peripheral seal 3 and evacuation cap 18 seal 7 wherein both seals 3,7 are adapted to be soldered at substantially the same temperature.

BRIEF DESCRIPTION OF THE DRAWINGS

FIG. 7 shows a displaceable heater.
FIG. 8 illustrate the non-planar pane surface effects.

DETAILED DESCRIPTION

Figure 1:
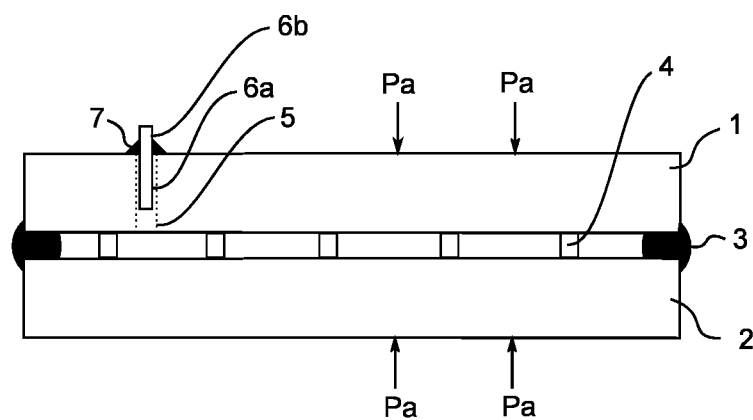
FIG. 1 shows a VIG unit.

FIG. 1 shows a vacuum insulating glazing (VIG) unit with 2 glass panes 1,2. The VIG production method is done by providing a first and second substantially parallel panes 1,2, a plurality of pillars 4 and a peripheral seal 3. The peripheral seal 3 is sealed for example by solder frit or solder glass or metal solder. The panes 1,2 are spaced by pillars 4 which withstand the pressure when the VIG is evacuated and the atmosphere acts on the VIG. The pane 1 has an evacuation hole 5 with an evacuation tube 6. The evacuation tube 6 has a seal 7 for example solder glass or frit paste or metal solder. A part 6*a* of the evacuation tube thereby remains enclosed in the evacuation hole 5 by the pane 1 and the seal 7, leaving an evacuation tube tip 6*b* exposed to the atmosphere.

Figure 2:
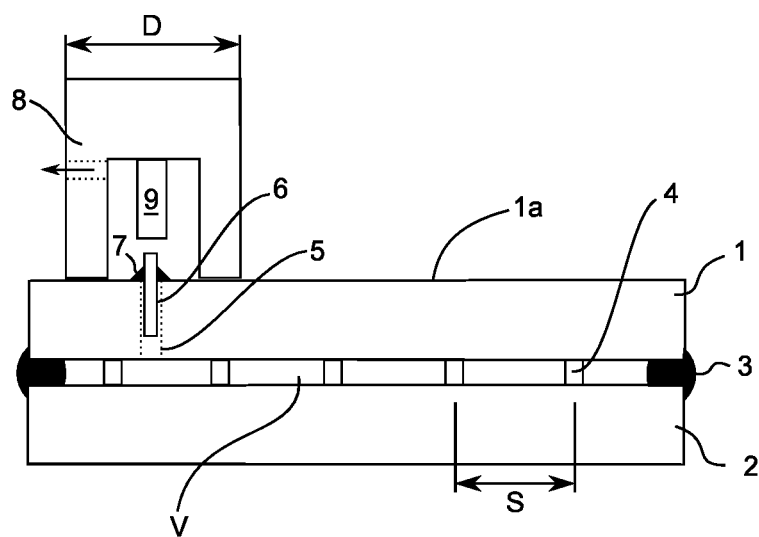
FIG. 2 shows a VIG unit and an evacuation head.
Figure 3:
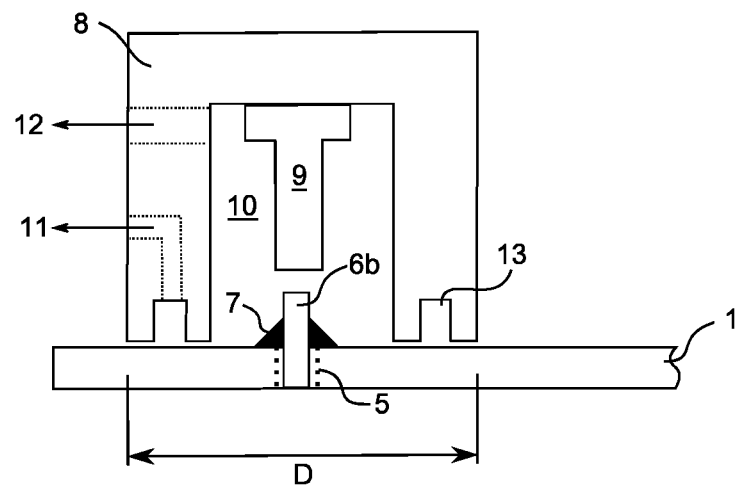
FIG. 3 shows a close up example of the evacuation head.

FIG. 2 shows a VIG now with an evacuation head 8 placed in contact with the exterior face of pane 1. In a manufacture facility there may be several VIG units and evacuation heads 8 in one oven. The VIG production method comprises heating the VIG in an oven to seal the peripheral seal 3 and the tube seal 7. When the VIG cools in the oven the evacuating of the void V is started. Typically, at 150° C. or more, preferably at 300° C. or more. At 300° C. or more the seals 3,7 are still deformable and can hereby better settle properly. The evacuating of the void V is performed in a heating oven after substantially soldering the seal 3. The evacuation head 8 covers the evacuation hole 5 and associated tube 6 and is adapted to evacuate the interior void V. After evacuation a heating element 9 melts the evacuation tube tip 6*b* to seal the void V (known as the tip off step). The method of producing a VIG unit may hereby be performed in an oven.

The evacuation head 8 performs best with a substantially hermetic contact to the glass pane 1,2. This assumes the glass panes 1,2 are planar.

The evacuation head 8 has a contact to the pane 1,2 having a diameter D. In the state of the art the diameter D is 50-100 mm. In the state of the art a large contact area (between glass pane and the evacuation head) is desired so that the air molecules have difficulty passing i.e. longer travel to pass the hermetic contact area.

However, the evacuation of the VIG exposes the glass panes 1,2 to an atmospheric pressure pressing towards the void V (FIG. 1, Pa) and this may warp the pane 1,2 surface as illustrated in FIG. 8*a*. Further tempered glass is less planar than float glass due to the manufacturing process. In particular, tempered glass may have a curved periphery as illustrated in FIG. 8*b*. These factors work against the prior art evacuation head 8 and the hermetic contact to the pane face 1*a* as illustrated in FIG. 8*a*,8*b*. And as explained later a large evacuation head 8 also has adverse temperature distribution effects.

Consequently, it is advantageous that the contact width D is less than 50 mm. Preferably the evacuation head 8 contact width D is below 45 mm. Most preferably the evacuation head 8 contact width D is between 24-40 mm. In one aspect the width D is substantially circular and a diameter D.

With the specified size there is provided better evacuation and an enhanced VIG is produced. The pane non-planar face 1*a* has better contact to a smaller evacuation head 8. This is advantageous with tempered glass and during evacuation inside a heated oven.

The evacuation head 8 with reduced width enables VIG units where the evacuation hole is located closer to the periphery. The evacuation hole 5 or tube 6 has a center substantially less than 25 mm from the pane 1,2 periphery, preferably less than 20 mm. In one example the evacuation hole 5 or tube 6 is further situated at the corner of the VIG and the center distance applies to both peripheries.

The pillars 4 are spaced by a distance S. Typically in the range of 20-50 mm. With thick or strong glass panes 1,2 such as tempered glass the distance S is about 40 mm. It is desired to increase the distance S due to appearance and better thermal insulation. In one aspect the evacuation head 8 contact width D is equal or smaller than the pillar 4 spacing distance S. Hereby an enhanced evacuation and VIG is provided.

Figure 4:
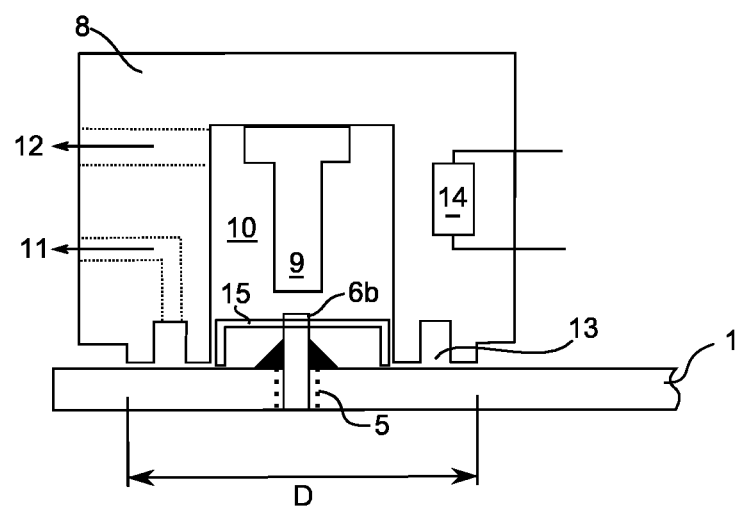
FIG. 4 shows another example of the evacuation head.

Reducing the contact width D has challenges, because the evacuation head 8 needs to accommodate a heating element 9 and it needs a chamber 10 to accommodate the evacuation tube 6. Further the evacuation head 8 may have at least one surrounding conduit 13 (for vacuum suction to fix the evacuation head 8 to the pane) which also requires room and evacuation tubes 11, 12 to different vacuum pumps. Optionally also a seal, O-ring or gasket towards the glass contact surface (not shown). Optionally also (FIG. 4), a shield plate 15 placed in the chamber 10 so that the tube tip 6b is exposed to the heat in the chamber 10 and the remaining VIG is not affected by the heat.

Manufacture of VIG units is quite temperature dependent. The peripheral seal 3, the glass pane 1,2 structure and treatments, the evacuation hole seal 7 and the degassing of materials all depend on the temperature. Through the steps of producing a VIG the temperature is varied (FIG. 6. shows three different steps) to degas the void V and solder the seals 3. In case the evacuation head 8 is used to tip off (i.e. seal off) the evacuation tube tip 6b there is a heating element 9 in the evacuation head which shortly heats to for example 700-1200° C. degrees to melt the tip of the evacuation tube 6.

In particular, when using tempered glass, it is particularly desirable to keep the temperature of the tempered glass below the annealing temperature of the tempered glass, which otherwise will lead to loss of temper and reduced glass strength. Accordingly, a method of producing a VIG unit according to the disclosure, and wherein the VIG body production in an oven includes heating the VIG unit in the oven, may comprise in all steps keeping the temperature below an annealing temperature, which detrimentally affects the tempered glass, such as keeping the temperature below 400° C., which is a common annealing temperature for many tempered glasses. As, in some embodiments of the present disclosure, the evacuating of the void V is done at 150° C. or more, preferably at 300° C. or more, it is preferable that the temperature of the oven is between 150° C. and 400° C., preferably between 300° C. and 400° C. during evacuation.

In the state of the art the heater element is typically a fixed tungsten coil heater. The prior art tungsten coil has the drawback, that it can produce metal deposits on the glass and it is less durable and produces a varied seal of the tube tip 6b. Further, the prior art evacuation head comprising a tungsten coil has the drawback, that the tungsten coil can only be operated under sufficient vacuum, which prevents heating with a tungsten coil under atmospheric pressures.

The evacuation head 8 has a heating element 9. The heating element 9 may be a ceramic heater. The ceramic heating element 9 may comprise a heat generating resistor component. The ceramic heater may comprise a piezoresistive component. The ceramic heater may comprise an electrically resistive ceramic component.

The ceramic heater 9 can be located within the evacuation head 8. The power cables can for example be provided inside the evacuation tubes 11,12 and/or by the evacuation tubes 11,12 if they have sufficient electric conductivity. Hereby the hermetic properties of the evacuation head 8 are not affected by the h 9.

A ceramic heating element 9 is more durable and provides reliable VIG production. A ceramic heater 9 has a more constant heat profile. The heating element 9 in the prior art shortly raises the local temperature to melt the tip 6b of the evacuation tube 6. But, as explained below, a ceramic heating element 9 also enables heating to multiple temperatures.

As the majority of the heat transfer under vacuum is by heat radiation, particularly suitable sources of ceramic heaters are such ceramic heaters that emit most strongly within the IR-absorptive region of glass, in particular silicon nitride and/or aluminum nitride ceramic heaters. Such ceramic heaters have particularly strong emission in the frequency band from 4 to 13 µm, making them particularly suitable in the VIG manufacture.

In some embodiments, the ceramic heating element 9 may be a cylinder as depicted in the figures of the present disclosure. Where homogenous surface radiation is preferred, the ceramic heater can be flat disc shaped, or where focused radiation is desired, e.g. for better tip off of the evacuation tube tip 6b, parabolic shapes would be preferred. A further advantage of the use of ceramic heaters is the possibility to combine two or more differently shaped heaters to obtain a variety of radiation profiles based on the combined shaped heater. E.g. a flat disc shaped heater can be combined with an elongated cylinder shaped heater to provide both focused and planer energy to the surface. Further, by having separate energy supplies, the two or further heaters can be operated separately, depending on the design needs of the VIG manufacture.

Figure 5:
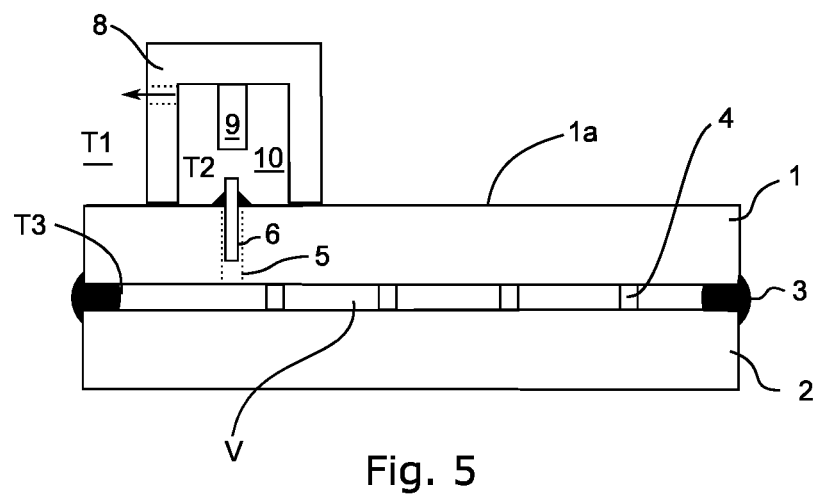
FIG. 5 shows temperature reading locations.
Figure 6:
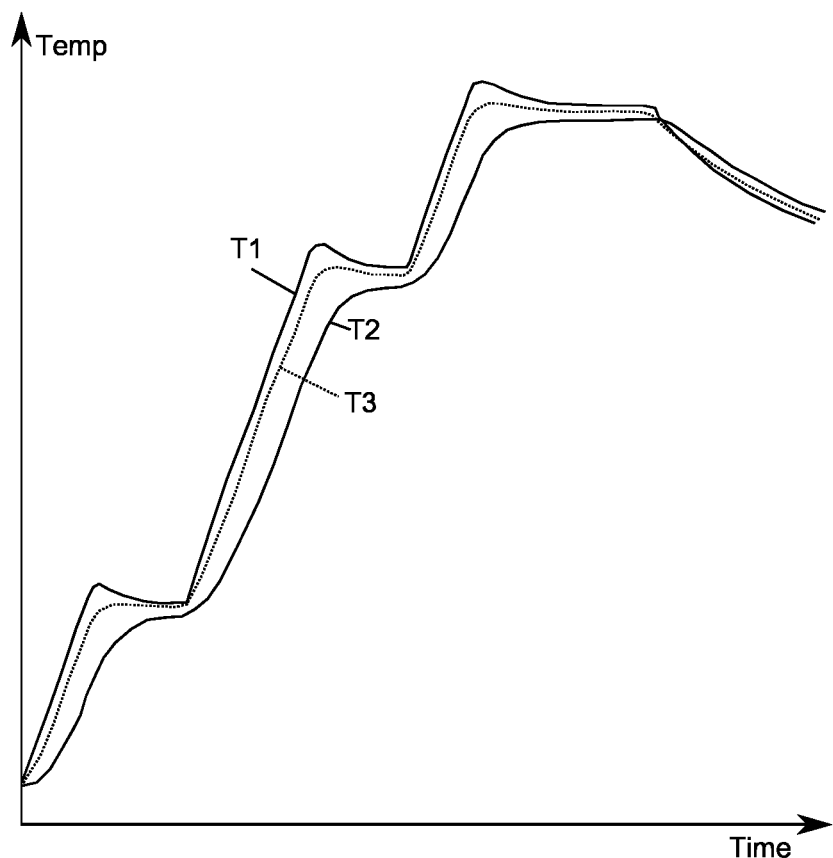
FIG. 6 shows chart of temperature differences and heating steps.

The VIG manufacture is enhanced when the temperature throughout the VIG body is continuous i.e. minimize the temperature differences across the body. When the evacuation head 8 is placed on the pane face 1a of the pane it affects the local temperature. FIG. 5 shows different locations for established temperature T2 inside the evacuation head 8. Temperature T1 in the surrounding air. And temperature T3 in the junction between the panes 1,2. FIG. 6 shows a chart of the difference or delay in temperature during the VIG manufacture heating steps. It shows that the pane 1 glass temperature gradient is different at the location of the evacuation head 8. The local temperature T2 at the evacuation head 8 is lower.

It is advantageous to ensure the temperature under the evacuation head 8 matches the surrounding VIG body temperature (i.e. close to T3), respectively surrounding air temperature T1. Even a 10-30° C. temperature difference can adversely affect the VIG manufacture. To this aim, the evacuation head 8 can be equipped with a temperature sensor (not shown) to continuously measure the temperature difference exterior and interior to the evacuation head. A closed loop current feedback to the heating element 9 would then be advantageously employed.

In particular, where the solder glass is a low temperature solder glass, in particular a lead-free low temperature solder glass, such as a VBZ-solder glass, it may be desirable to compensate for the temperature difference between VIG body temperature, respectively surrounding air temperature T1, and the temperature T2 under the evacuation head 8, as the narrow windows of temperatures applied leave little room for deviations if a sufficient solder glass is to be created by the soldering process. E.g. tempered glass is negatively influenced by high temperatures and long heating times, hence incomplete matching of the temperature T2 under the evacuation head 8 to the solder temperature, will lead to longer soldering times and hence to increased loss of temper in the glass.

In one aspect, the evacuating head 8 has fins to enhance the thermal transfer between the surrounding air and the evacuation head 8. Hereby the temperature under the evacuation head 8 T2 has a better match to the surrounding temperature T1.

A further advantage of matching the temperature T2 under the evacuation head 8 to the temperature of the surrounding air T1 lies in securing adequate parture of the solvents and binders comprised in the solder glasses used for manufacturing the VIG units of the disclosure. If the temperatures under the evacuation head 8 is too low, reduced parture of solvents and binders will be observed, resulting in incomplete soldering of the solder glasses at a later stage or increased loss of temper due to increased soldering times.

In one aspect the heater 9 has a first heating temperature and a second heating temperature. The second heating temperature is nearly twice as high as the first heating temperature. The first heating temperature is the peripheral seal 3 solder temperature (for example 300-450° C.), and the second heating temperature is the sealing temperature of the tube tip 6b (for example in the interval of 700-1200° C.)

In one aspect, when the heater is a ceramic heater, the heating element 9 is on at least for 15 minutes for the first temperature. The heating element 9 substantially heats for the duration of at least one heat step, preferably the solder step. The state of the art, tungsten heaters are usually on for seconds only.

The first temperature provides a substantially uniform VIG body temperature T2 beneath the evacuation head 8. Hereby the temperature under the evacuation head 8 has a better match to the surrounding temperature T1. This provides a better tube seal 7 solder and the remaining VIG is not affected by heat gradients and stress.

In another aspect (FIG. 4) the evacuation head 8 first and second temperature is provided by a first heating element 9 and a second heating element 14. The second heater may be outside the chamber 10. Hereby each heater is customized to heat to the specified first and second temperature.

FIG. 7 shows an evacuation head 8 with the ceramic heating element 9. Here the ceramic heating element 9 is displaceable and configured to move towards the tube tip 6b and contact the tube tip 6b. The ceramic heating element 9 is heated to the tip off temperature such as of 700-1200° C. and brought into contact with the tube tip 6b. The tube tip 6b may be pressed by the ceramic heating element 9 and deformed during the seal off. Hereby the sealing of the tube tip 6b is reliable and has little influence on the remaining VIG body. The displaceable heater 9 may be employed in an oven during the VIG sealing and evacuation and tip off.

The ceramic heating element 9 displacement may for example be in the interval of 1-3 mm. An actuator 16 may displace the ceramic heater 9. The actuator 16 may be based on a material which expands when heated to the tip off temperature. The actuator may be an electric piezo actuator. The actuator 16 may operate by way of an electromagnet 17 such as an external electromagnet 17, which displaces the heating element 9. These examples of actuators ensure the hermetic properties of the evacuation head 8 are intact while providing operation in the hot oven environment. Other actuators may be employed.

Above, the present disclosure has been exemplified using an evacuation tube 6 inserted into evacuation hole 5 and soldered to the pane face 1a of the first pane 1. The present disclosure, however, is not limited in the manner in which evacuation occurs, nor in the art or construction of the evacuation tube 6.

In the art (c.f. e.g. US 2009/0155500 A1, US 2012/0148795 A1, both herein incorporated by reference) many other evacuation solutions are known for use with an all-metal cup of the prior art. The advanced in technology as described herein regarding the construction and design of evacuation heads 8 allow for improved implementation of these further advantageous implementations of the evacuation tube 6.

One common method of closing an evacuation hole 5 is by allowing solder glass (in the form of a solder glass or frit ring, cf. e.g. FIG. 5 of US 2012/0148795 A1) to melt down into the evacuation hole 5, thus dispensing with the evacuation tube 6. This prior art method is advantageous in that it requires lower melting temperatures than what is sufficient for melting the glass of the evacuation tube. However, disadvantageously, it requires significantly longer melt times. With the tungsten heater, as employed in the prior art, and in particular with the large evacuation heads of the prior art, this has been observed to result in damage to the pane 1, e.g. by the aforementioned deposit from the heater to the surface. By reducing the evacuation head diameter D as detailed herein and/or by using a ceramic heating element 9 for localized heating, improved melting with shorter on-times can be achieved and concomitantly reduced damage to the pane 1. In the same manner, bung-like closures or cap-like closures can improved be soldered to the pane face 1a with less damage using the evacuation heads 8 detailed herein.

Figure 9A:
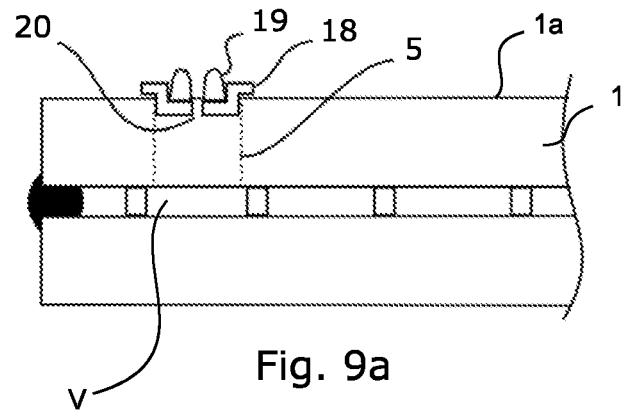
FIG. 9 illustrate alternative closures.
Figure 9B:
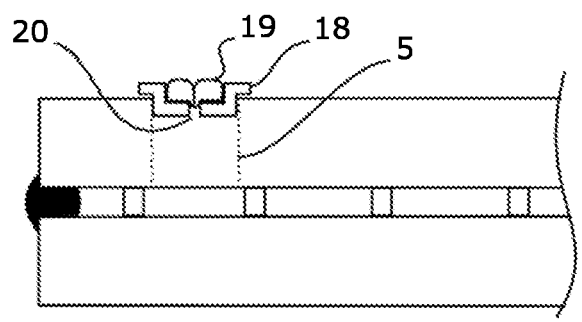

FIG. 9 details elements of the further improvements, which will be described below. In FIG. 9a, a disc shaped evacuation cap 18 has been soldered to the pane face 1a of the first pane 1. Preferably, the evacuation cap 18 is partly inserted into the evacuation hole 5. The cap 18 comprises an evacuation port 20 and a solder glass ring 19 arranged around the evacuation port 20 on the cap 18, the solder glass ring 19 facing away from the interior void V, when the cap 18 is inserted into the evacuation hole 5. Preferably, the cap 18 has a depression for comprising the solder glass ring 19 and the evacuation port 20. FIG. 9b shows the situation after evacuation of the void V and subsequent closure of the evacuation port 20 by melting the solder glass ring 19, which under the influence of gravity, will flow into the evacuation port 20 thereby forming a tight seal for the evacuated void. For improved heat transfer and protection of the evacuated void V as well as the glass pane 1, the evacuation cap 18 is manufactured from metal, although glasses are suitable as well.

Such evacuation caps 18 are particularly preferable in VIG manufacture as they do not, contrary to the evacuation tubes 6, require further capping to protect the sealed tube from external damage, hence saving manufacturing steps and cost without loss of VIG life time in use. However, their use has hitherto been limited by the fact that with the prior art evacuation heads, unwanted heating of either or both of pane 1 and cap 18 would lead to thermal expansion of these elements and crack formation where pane 1 and cap 18 interact. The present, localized heating obtainable by the evacuation heads of the present disclosure, overcome these problems.

Figure 10A:
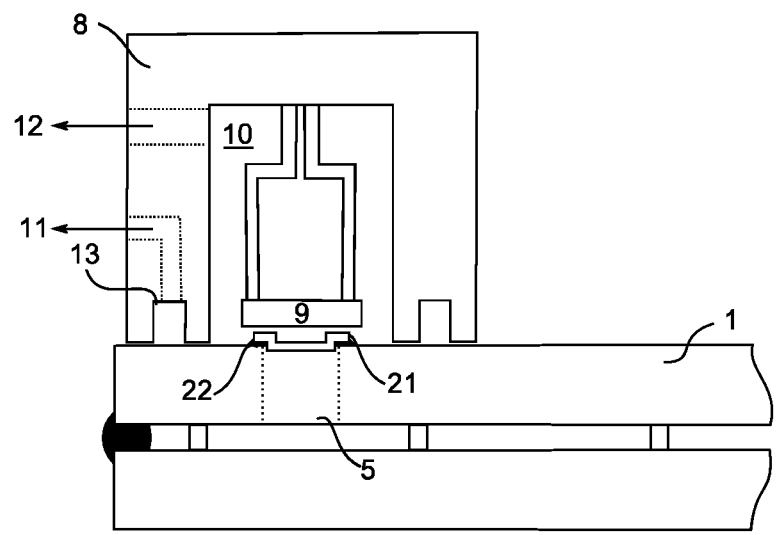
FIG. 10 illustrate alternative closures.
Figure 10B:
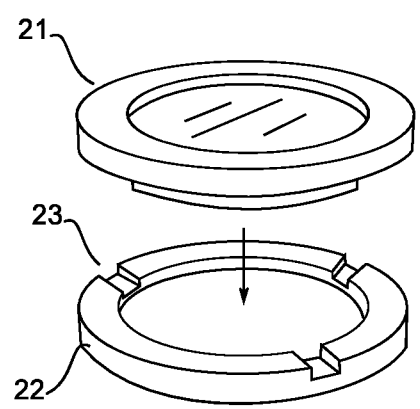

Also suitable for use with the evacuation head 8 of the disclosure is a disc shaped evacuation cap 21 as depicted in FIGS. 10a and 10b, wherein the solder glass ring 19 and the evacuation port 20 are no longer located on the top of the evacuation cap 21, but rather at its periphery and in between evacuation cap 21 and glass pane 1. Here, the disc shaped evacuation cap 21 is prepositioned in the evacuation hole 5 and provided with a discontinuous and/or dented solder 22 between the evacuation cap 21 and the glass pane 1, wherein the spaces and/or dents 23 between the discontinuous or indented solder 22 serve the function of the evacuation port 20 of the previous embodiment. When the ceramic heater 9 subsequently heats the solder to form the solder glass, the spaces and/or dents 23 between the discontinuous and/or dented solder 22 coalesce into a continuous solder glass in response to the heating. This evacuation cap is particularly suitable for use with a flat, disc shaped ceramic heating element 9, having the added benefit that the distance between heater and evacuation cap can be reduced to within 0.5 mm to 2 mm for improved heat transfer between heater and evacuation cap.

Figure 11:
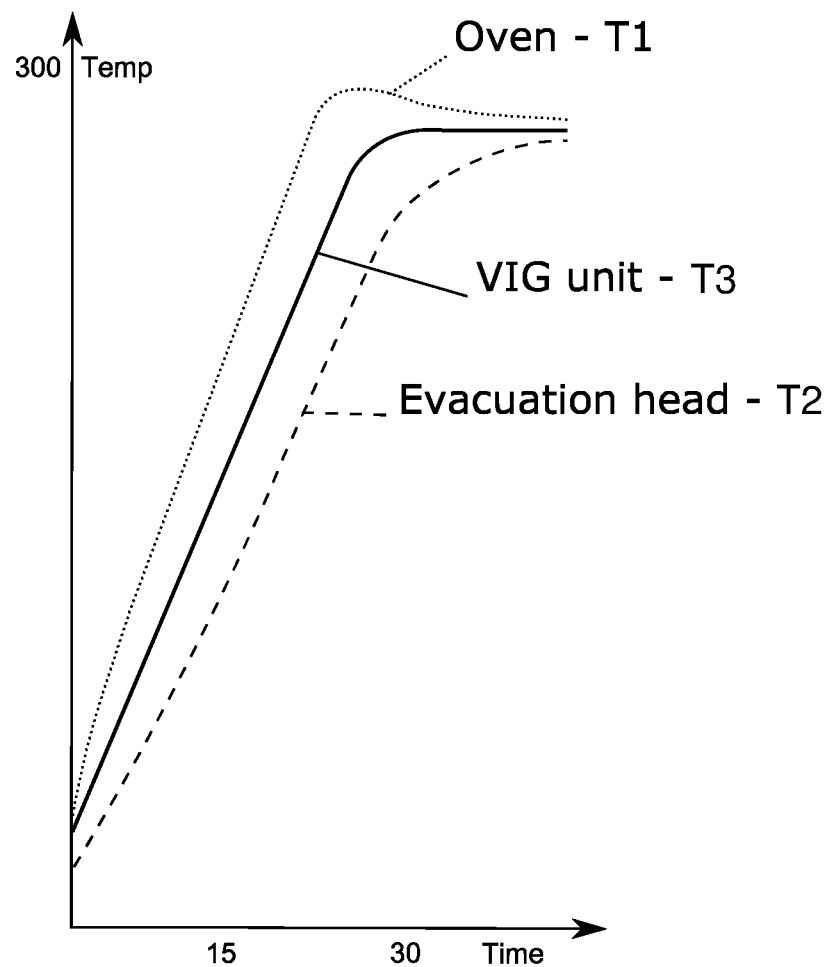
FIG. 11 show the temperature difference between surrounding air T1 and evacuation head T2.

Now some effects are described in particular with reference to FIG. 11, wherein is shown the experimentally measured surrounding air temperature T1 and the temperature T2 under the evacuation head 8 over 45 minutes. The solder seal 7 for the evacuation tube 6 is temperature sensitive because the seal 7 requires enough heat to seal properly (for example 300-450° C.) and the reduced temperature beneath the evacuation head 8 as explained in FIGS. 5 and 6 may prevent a proper seal. This is solved by the heating elements 9,14 and/or evacuation head 8 as presented in this disclosure. The disclosed evacuation head 8 provides more uniform temperature because it covers less area. And the heating element 9 and optionally heating element 14 provide a temperature at the evacuation head 8 which matches the surrounding oven sealing temperature.

The ceramic heater enables a compact evacuation head with enhanced hermetic contact and enhanced thermal distribution below the evacuation head.

Further, the solder seal 7 for the evacuation tube 6 is temperature sensitive because the tube tip off heat (700-1200° C.) may deteriorate the seal 7 and may weaken a tempered glass pane or coated pane. This drawback may be solved by the shield plate 15 (FIG. 4) or by a ceramic heater 9 as disclosed (which may also be displaceable as explained).

Generally, the disclosed embodiment of the ceramic heating element 9 and the disclosed embodiment of the displaceable heater 9 and the disclosed embodiment of the evacuation head 8 with a defined size D are suitable for combination, but likewise the three embodiments may also be employed separately.

Generally, the present disclosure is suitable and advantageous for a tempered glass VIG.

Generally, the evacuation head 8 and/or ceramic heater 9 may be employed outside an oven.

Although the present disclosure has been described in detail for purpose of illustration, it is understood that such detail is solely for that purpose, and variations and combinations can be made therein by those skilled in the art without departing from the scope of the appended claims. The temperatures indicated are not limiting unless stated otherwise.

The invention claimed is:

1. A method of producing a vacuum insulated glazing (VIG) unit, the method comprising:
   providing first and second substantially parallel glass panes, a plurality of pillars, and a peripheral seal between the first and second glass panes;
   providing an evacuation hole for evacuating a void through the evacuation hole to a pressure less than atmospheric pressure,
   wherein the first and second glass panes are tempered glass;
   covering the evacuation hole with an evacuation head, wherein the evacuation head is configured to have a substantially hermetic contact to a surface of the first glass pane,
   wherein a distance between pillars of the plurality of pillars is 38 to 42 mm;
   wherein a contact width of the evacuation head to the surface of the first glass pane is equal to or less than the distance between the pillars of the plurality of pillars; and
   evacuating the void through the evacuation head.

2. The method of producing the VIG unit according to claim 1, wherein the evacuation head is configured to reduce a temperature difference between a temperature of a VIG body beneath the evacuation head and a temperature surrounding the VIG body.

3. The method of producing the VIG unit according to claim 1, further comprising evacuating the void while the VIG unit is disposed in an oven.

4. The method of producing the VIG unit according to claim 3, further comprising heating the VIG unit in the oven, wherein the heating is at a temperature less than an annealing temperature of the tempered glass.

5. The method of producing the VIG unit according to claim 3, wherein the evacuating of the void is at a temperature of 150° C. or greater.

6. The method of producing the VIG unit according to claim 3, wherein the temperature of the oven is between 150° C. and 400° C.

7. The method of producing the VIG unit according to claim 3, wherein the evacuating of the void is performed in the oven after substantially soldering the peripheral seal.

8. The method of producing the VIG unit according to claim 3, further comprising substantially soldering the peripheral seal in the oven, and subsequently evacuating of the void.

9. The method of producing the VIG unit according to claim 3, further comprising sealing an evacuation tube tip of an evacuation tube by heating, wherein the heating is provided by a heat element in the evacuation head.

10. The method of producing the VIG unit according to claim 1, wherein the evacuation head has a substantially circular shape and the contact width is a diameter of the substantially circular shape.

11. The method of producing the VIG unit according to claim 9, wherein the evacuation head further comprises a ceramic heating element, and wherein the method further comprises heating the ceramic heating element and sealing the evacuation tube tip of the evacuation tube.

12. The method of producing the VIG unit according to claim 11, further comprising:
   heating the ceramic heating element to a first temperature to provide a substantially uniform VIG body temperature T2 beneath the evacuation head; and
   heating the ceramic heating element to a second temperature to seal the evacuation tube tip.

13. The method of producing the VIG unit according to claim 9, wherein the evacuation tube is an evacuation cap comprising an evacuation port and a solder glass ring arranged around the evacuation port.

14. The method of producing the VIG unit according to claim 1, wherein the contact width of the evacuation head to the surface of the first glass pane is 24 mm to 40 mm.

* * * * *